INVENTOR.
NORMAN L. STAUFFER

ATTORNEY.

INVENTOR.
NORMAN L. STAUFFER

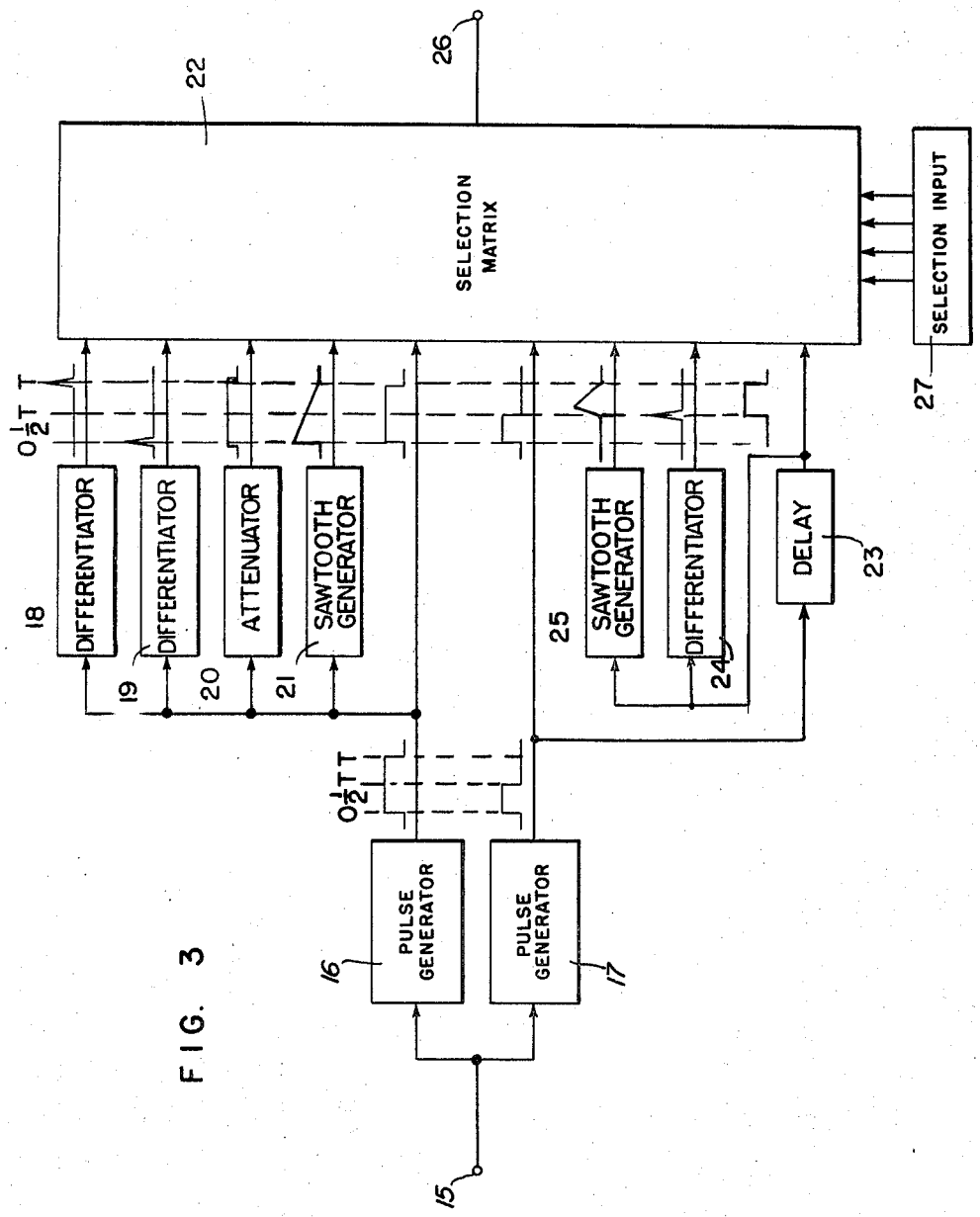

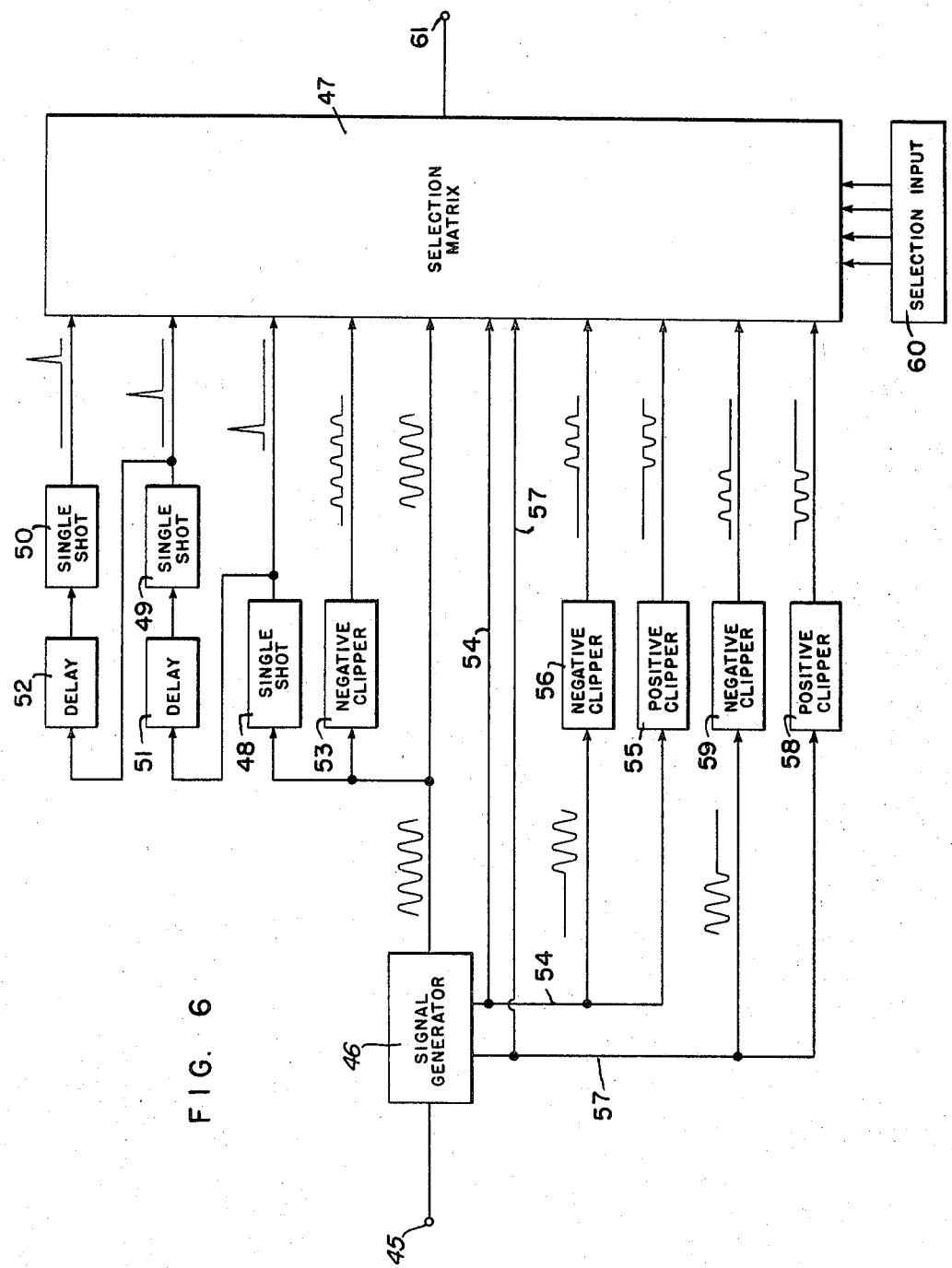

Jan. 14, 1969     N. L. STAUFFER     3,422,444

ALPHANUMERIC GALVANOMETER RECORDER

Filed Nov. 22, 1966     Sheet 5 of 7

INVENTOR.
NORMAN L. STAUFFER
BY

ATTORNEY.

Jan. 14, 1969  N. L. STAUFFER  3,422,444

ALPHANUMERIC GALVANOMETER RECORDER

Filed Nov. 22, 1966

INVENTOR.
NORMAN L. STAUFFER
BY
Arthur H. Swanson
ATTORNEY.

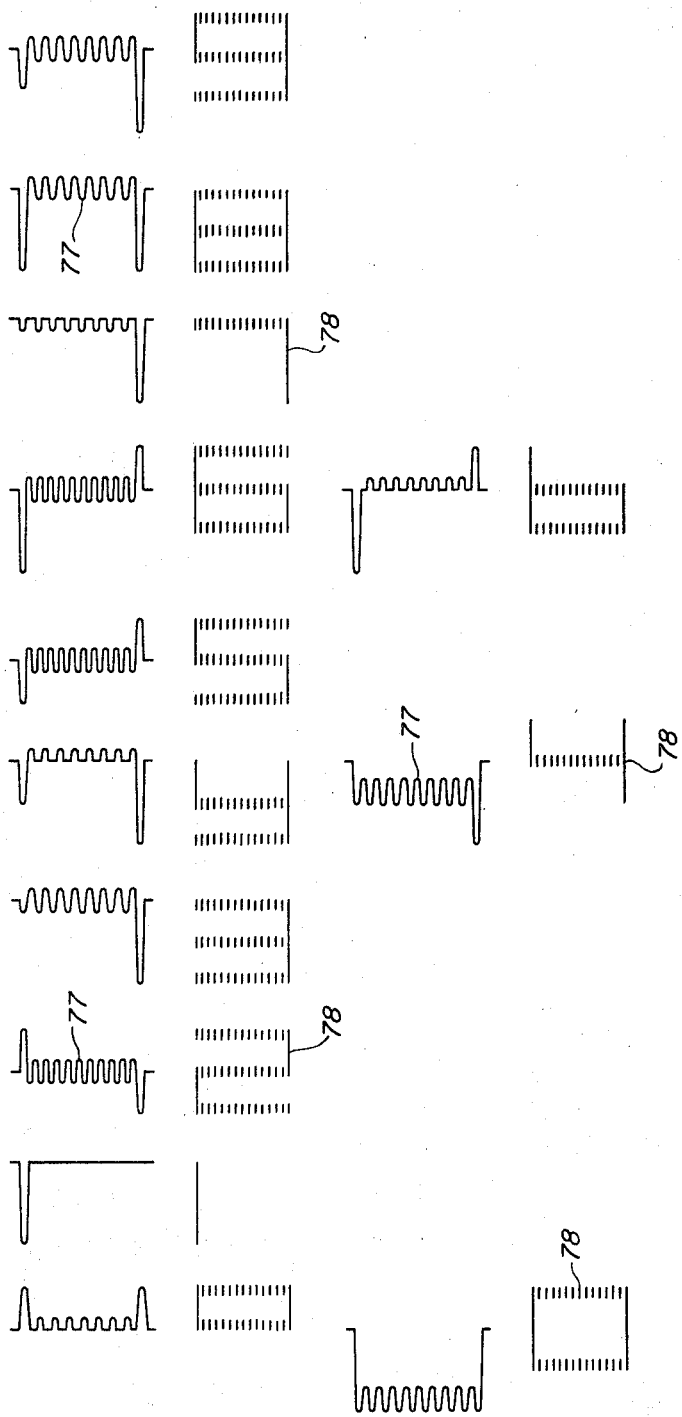

United States Patent Office 3,422,444
Patented Jan. 14, 1969

3,422,444
ALPHANUMERIC GALVANOMETER RECORDER
Norman L. Stauffer, Englewood, Colo., assignor to Honeywell Inc., Minneapolis, Minn., a corporation of Delaware
Continuation-in-part of application Ser. No. 478,115, Aug. 9, 1965. This application Nov. 22, 1966, Ser. No. 596,288
U.S. Cl. 346—109           9 Claims
Int. Cl. G01d 9/42; H04l 15/24; H04l 15/34

ABSTRACT OF THE DISCLOSURE

An alphanumeric recorder having a galvanometer equipped with a mirror which is deflected by an input signal applied to the galvanometer. A lens and mirror system directs a beam of light toward the galvanometer mirror where it is reflected through a second lens system onto an opaque mask. The opaque mask prevents the light beam from falling upon a light sensitive paper, located behind it. A slit in the opaque mask allows the light beam to pass through the mask and fall upon the light sensitive paper, during a deflection of the galvanometer caused by the input signal. The light beam thus exposes the paper for recording an alphanumeric character on its surface.

---

The application is a continuation-in-part of application Ser. No. 478,115, now abandoned, which was filed on Aug. 9, 1965.

The present invention relates to alphanumeric recording apparatus; and, more particularly, it relates to an oscillographic recorder utilizing a light sensitive recording medium to record letters of the alphabet and numerals.

Conventional high speed line printers operate at a speed substantially below the maximum speed at which their input information can be supplied to them. The present invention utilizes a light sensitive recording medium and an adjustable light beam for recording letters of the alphabet or numerals thereon and thus provides a potentially faster means for printing alphanumeric information than previously known. Through the utilization of a multichannel oscillographic recorder, such as the apparatus described in a Patent No. 3,066,299, by Kampf and which issued Nov. 27, 1962, the present invention records a plurality of alphanumeric characters simultaneously upon a moving recording medium in a multiple column arrangement.

Accordingly, one object of the present invention is to provide an improved apparatus for recording characters that is simple in operation and construction.

Another object of the present invention is to provide an improved apparatus for recording alphanumeric characters utilizing galvanometric apparatus and light sensitive recording media.

Still another object of the instant invention is to provide an alphanumeric recording apparatus within an oscillographic recording device which is capable of recording a plurality of characters in multiple columns across the surface of a recording medium in a rapid continuous manner.

A further object of the invention described herein is to provide an alphanumeric recording apparatus within an oscillographic recorder capable of printing letters of the alphabet and numerals upon a recording medium associated therewith simultaneously with the recording of analog information thereon.

A still further object of the present invention is to provide an alphanumeric recording apparatus within an oscillographic recorder capable of printing multiple columns of alphanumeric characters in a plurality of lines, perpendicular to the longitudinal motion of the recording medium; or apparatus capable of printing a single column of alphanumeric characters, parallel to the longitudinal motion of the recording medium, but read in either a line perpendicular to the longitudinal motion or parallel thereto.

In accomplishing these and other objects, there has been provided, in accordance with the present invention, alphanumeric recording apparatus for visually recording characters comprising a galvanometer which includes a mirror mounted for movement with the galvanometer movement. Input circuitry connects the galvanometer for supplying electrical input signals of predetermined wave shapes thereto. A light source is arranged to be focused through a lens system upon the galvanometer mirror for reflection therefrom toward a light sensitive recording medium. The recording medium is driven under a mask, located between the recording medium and the galvanometer mirror. The galvanometer is normally arranged for directing its reflected light source to fall upon the mask. The mask is provided with an aperture therein having a longitudinal axis arranged transversely to the direction of motion imparted to the driven recording medium. Application of the predetermined electrical input signals from the input circuitry deflects the galvanometer mirror for moving the light source into the mask aperture and focusing it upon the recording medium thereby exposing the light sensitive medium for recording alphanumeric characters thereon.

A better understanding of the present invention and a broader knowledge of other objects and many of the attendant advantages thereof will become known to those skilled in the art by reference to the following detailed description, when considered in connection with the accompanying drawings, wherein:

FIG. 3 is a schematic representation of the input circuitry suitable for obtaining the electrical input signals shown in FIG. 2;

FIG. 6 is a schematic representation of input circuitry suitable for obtaining the electrical input signals shown in FIG. 5;

FIG. 9 is a pictorial representation of the electrical input signals and resultant recorded alphanumeric characters obtained with the apparatus shown in FIG. 8.

Figure 1:
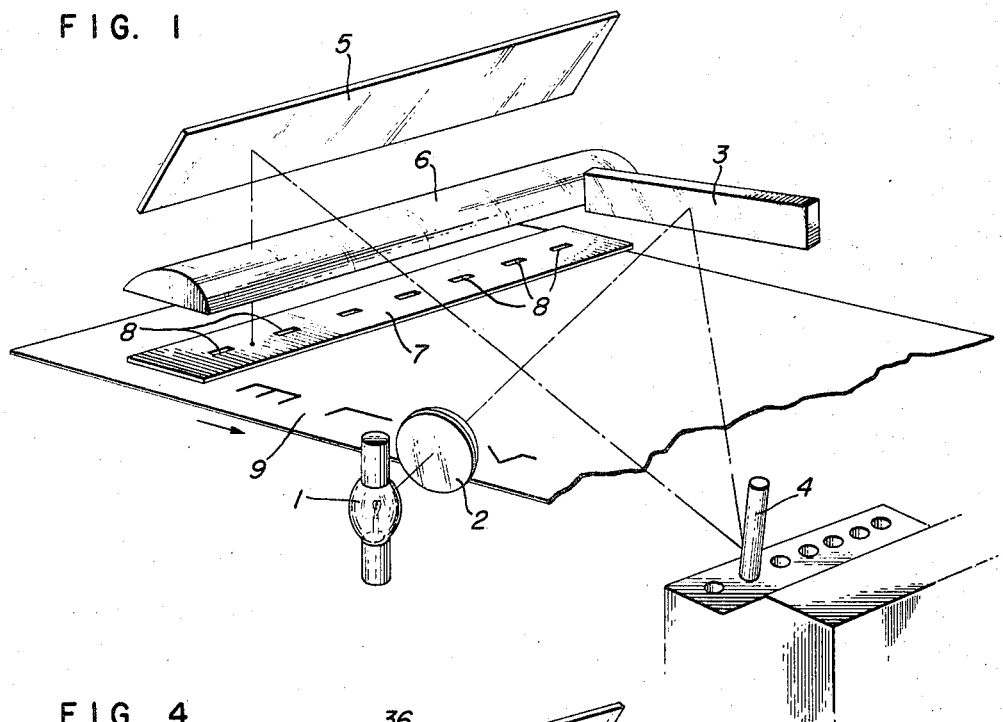
FIG. 1 is a diagrammatic perspective view, showing one embodiment of the alphanumeric recording apparatus of the present invention.

Referring now to FIG. 1 in more detail, there is shown a recorder embodying the present invention. A light source 1 is arranged to provide a light beam through a first focusing lens 2 to be reflected from a first mirror 3 to a galvanometer 4. After reflection from a mirror, carried by the galvanometer 4, the light beam is directed by a second mirror 5 through a second lens 6 against an opaque mask 7. The mask 7 is provided with a plurality of transversely aligned slits 8 spaced from each other. A light sensitive recording medium 9 is arranged to be driven past the mask 7 on the other side from the lens 6. It is to be noted that in this simplified showing only a single glavanometer has been shown while the mask is provided with a plurality of silts 8. Obviously, a plurality of galvanometers may be provided and associated with respective slits in the mask 7. Further, the light source in the recording apparatus used here has a high content of ultraviolet wavelengths and the light sensitive recording meduim 9 is marked by exposure to that ultraviolet radiation. However, without departing from the scope of the present invention, a source providing any form of radiation may be used in conjunction with a recording medium which is sensitive to that particular radiation. A general arrangement for a recording device suitable to be modified in accordance with the present invention is shown in the Kampf patent, referenced hereinabove.

The light beam from the galvanometer 4 is deflected from the mask surface and onto the recording medium 9 through the slit 8 by a galvanometer mirror movement induced by an electrical input signal applied to the galvanometer 4. The light beam may be deflected onto the medium 9 at any position encompassed by the slit 8; e.g., it may be deflected across the whole length of the slit 8. The deflection of the light beam will determine the recording mark made on the medium 9. Thus, by a deflection across the slit 8, a transverse line may be recorded; while holding the beam in a corner of the slit 8 will produce a longitudinal line, due to the motion of the recording medium 9.

Figure 2:
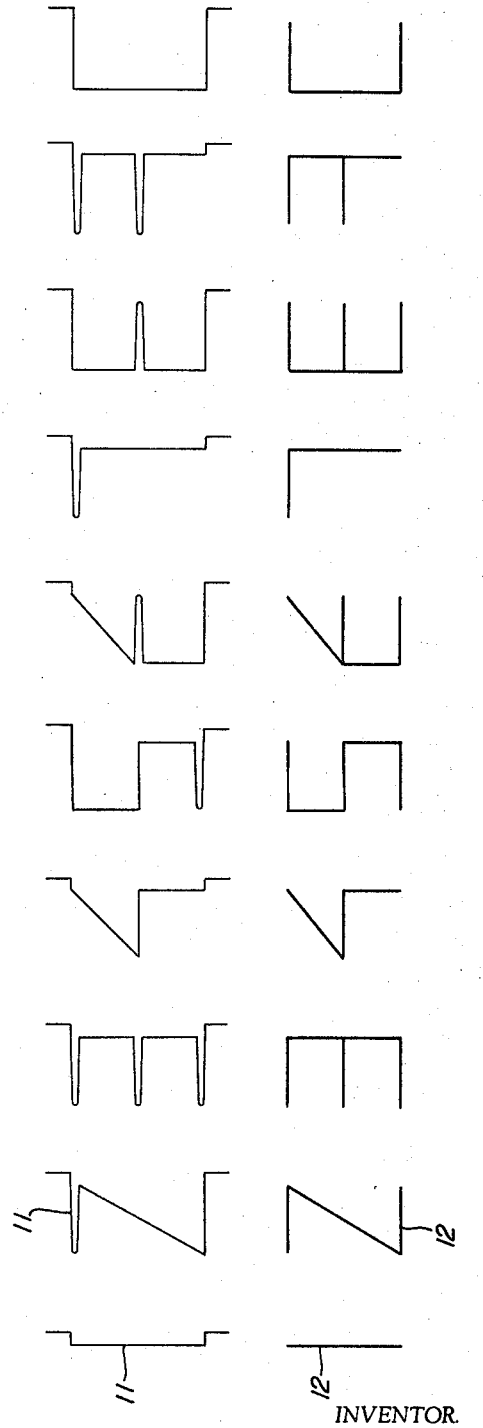
FIG. 2 is a pictorial representation of the electrical input signals, being galvanometer input signals, and resultant recorded alphanumeric characters obtained from the apparatus shown in FIG. 1.

In FIG. 2, there are shown the various electrical input signals 11 applied to the galvanometer 4 and the recorded aplhanumeric characters 12 produced thereby. For example in the case of the third recorded character which is arranged to be the number "3," the recording beam is first swept across the slit 8 and then positioned in the corner thereon, for a delayed time interval. This is followed by a second sweep, a second corner positioning and a third sweep with a final deflection back onto the mask 7. The numeral thus formed is marked upon the recording medium 9 from its lowermost portion toward the upper portion thereof, as the medium moves under the mask 7. The electrical input signal 11 is illustrated as a displaced wave form which is offset transversely from its beginning point, at the lowermost portion thereof, and manipulated by a series of transverse offsets for a predetermined amount of time, represented by the upward extension of the waveform along is vertical axis.

In FIG. 3, there is shown a suitable input circuitry means for providing the electrical input signals to the galvanometer for effecting the recorded alphanumeric characters shown in FIG. 2. A trigger, or clock, signal is applied to an input terminal 15. This is effective to trigger two pulse generators 16 and 17. Pulse generator 16 generates a square wave pulse of length T, while pulse generator 17 generates a square wave pulse commencing at the same instant as the first pulse but of length ½T. The pulse from generator 16 is applied individually to signal shaping circuits 18, 19, 20, and 21, and also by an input line directly to a selection matrix 22. Signal shaping circuits 18 and 19 produce a spike pulse at the beginning and end of the square pulse from pulse generator 16 by differentiation of the leading and trailing edges thereof, respectively. The circuit 20 attenuates the input pulse from generator 16 thereby producing a pulse having a smaller amplitude but having a period equalling the pulse length T. Finally, the signal shaping circuit 21 generates a sawtooth wave having a maximum amplitude at the beginning of the square pulse from generator 16 and uniformly diminishing to zero amplitude at the end of the pulse therefrom.

The half-length pulse from the pulse generator 17 is applied to a pulse delay circuit 23 and directly by an input line to the selection matrix 22. The pulse delay circuit 23 produces a second pulse, similar to the first half-length pulse, which is delayed by a time equal to the length ½T of the first pulse. The second pulse is terminated at a time equivalent to the end of the full square wave pulse of length T. The second delayed pulse is applied to the selection matrix 22 and also to signal shaping circuits 24 and 25. Circuit 25 is a sawtooth generator circuit which forms a pulse of maximum amplitude at the beginning of the second half-length pulse and diminishing to a zero amplitude at the end thereof. The signal shaping circuit 24 produces a spike pulse at the beginning of the second half-length pulse by differentiating the leading edge thereof.

The individually shaped signals formed by the signal shaping circuits, just described, are applied to toto to the selection matrix 22 by a plurality of matrix input lines. The appropriate combinations thereof are then selected for producing the required electrical input signals for application to the galvanometer 4 through a single matrix output line and output terminal 26.

For example, to write the number "3" the outputs from four signal shaping circuits are required. First, the recording beam is deflected from the mask 7 into the corner of slit 8 by the attenuator signal shaping circuit 20 for forming a recording mask upon the medium 9. Simultaneously, the spike pulse from the differentiator signal shaping circuit 19 causes the recording beam to sweep across the full transverse length of the slit 8 and back again for forming the lowermost leg of the numeral "3." Due to the continuous presence of the attenuator signal from circuit 20, the recording beam returns to the corner of the slit 8 and continues to form a recording mask upon the medium. Thereafter, differentiator signal shaping circuits 24 and 18 respectively apply their output signals to the output terminal 26, for completing the second and third legs of the numerial "3." In a similar manner, the number "1" requires the output signal from the attenuator signal shaping circuit 20. The number "2" requires outputs from circuits 21 and 18; number "4" requires outputs from circuits 20 and 25; number "5" requires outputs from 19, 20, and 23; number "6" requires outputs 17 and 25; number "7" requires outputs 20 and 18; number "8" requires outputs 17 and 23; number "9" requires outputs 20, 24, and 18; and number "0" requires outputs from circuit 16. The selection of the proper combination of output signals for each numeral is made simultaneously through the selection matrix 22; however, the output signals occur at the matrix output terminal 26 in the correct time relationship, due to the inherently characteristics thereof provided by the signal shaping circuits. The selection matrix 22 is controlled by a selection input unit 27 connected thereto by a plurality of matrix control lines. The selection input unit may be a manual keyboard or an electronic gating means, effective to select the desired ones of the shaped output signals from the individual signal shaping circuits. The selection matrix 22 and selection input unit 27 are devices well-known in the art and any suitable device may be used.

Figure 4:
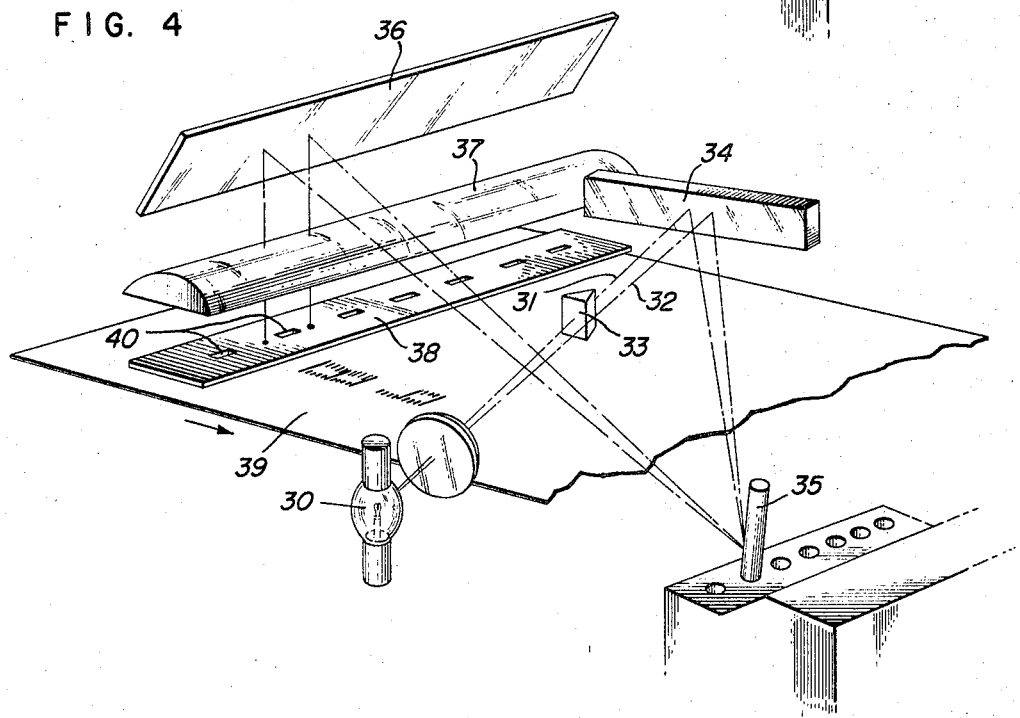
FIG. 4 is a diagrammatic perspective view, showing a second embodiment of the alphanumeric recording apparatus in accordance with the present invention.

A modification of the present invention is shown in FIG. 4, in which a first light beam 31 is obtained directly from a light source 30. A second light beam 32 is obtained by passing a portion of the light from the source 30 through a prism 33 for effectively forming a second apparent light source. The two beams 31 and 32 are directed by a first mirror 34 to a galvanometer 35. The beams are there reflected from a galvanometer mirror, not shown, toward a second mirror 36, through a second lens 37, and onto an opaque mask 38. A recording medium 39 is arranged to pass beneath the mask 38. Each light beam falls upon the plane of the opaque mask 38, as in FIG. 1. The mask 38 is further provided with a transverse slit 40 having a longitudinal axis perpendicular to the motion of the recording medium 39.

The recording operation of the structure shown in FIG. 4 is basically similar to that shown in FIG. 1 with the exception that the two beams of light may be used for recording purposes within the same transverse slit 40. The light beams are arranged on respective sides of their associated slit 40 and are each prevented from falling upon the recording medium by the presence of the mask 38, when the galvanometer 35 is unenergized. The application of an electrical input signal to the galvanometer causes a simultaneous movement of each recording beam for deflecting one into the transverse slit 40 and moving the other further onto the opaque mask 38. The beams may be swept across the slit to form transverse lines. Longitudinal representations are formed by alternately displacing a selected beam into one corner of the slit and onto the recording medium for forming a longitudinal series of recorded marks thereon. A longitudinal line may be formed on the either side of the slit 40, depending on the directions of galvanometer displacement. If it is desired to form parallel longitudinal lines, the beams are alternately displaced onto the recording medium in respective corners of the slit 40. Suitable electrical input signals 41 and the corresponding recorded alphanumeric characters 42 which are produced thereby are shown in FIG. 5.

Figure 5:
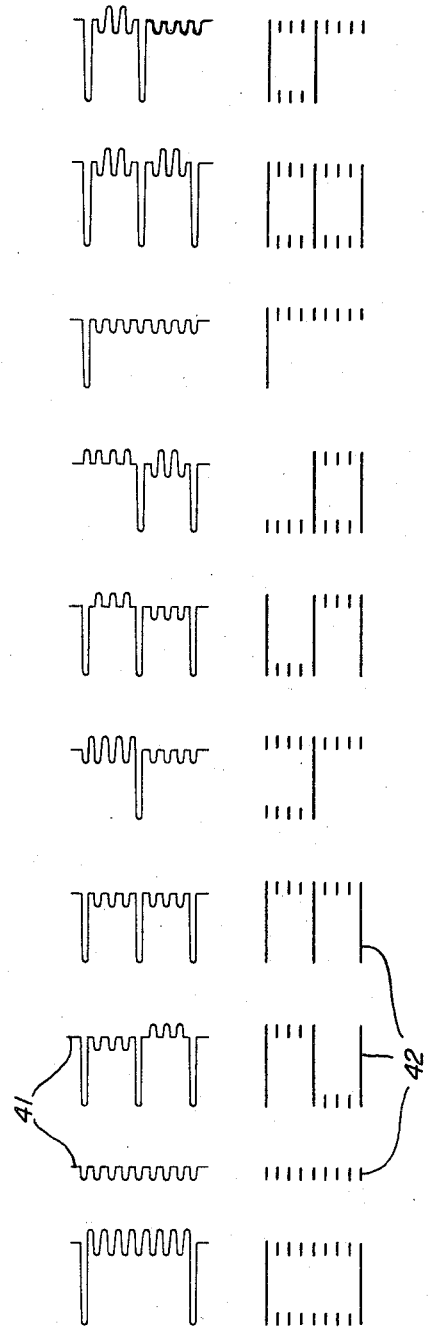
FIG. 5 is a pictorial representation of the electrical input signals and resultant recorded alphanumeric characters obtained from the apparatus shown in FIG. 4.

A block diagram of a suitable input circuit for producing the electrical input signals shown in FIG. 5 is shown in FIG. 6. A trigger signal is applied to input terminal 45 to trigger a signal generator 46 whose output is a continuous train of sine wave pulses. These pulses are fed to various signal shaping circuits and also applied directly to a selection matrix 47 over a matrix input line, as in FIG. 3. For example, the sine wave pulses are fed into a single shot circuit 48 which applies a spike pulse to the selection matrix 47; and also applies it to a second and third single shot circuit 49 and 50 through delay circuits 51 and 52, respectively. These delayed spike pulses are then fed into the selection matrix 47. The sine wave pulses from the generator 46 are also negatively clipped by a pulse shaping circuit 53 before application to the matrix 47. A matrix input line 54 connects to the generator 46 and provides a delayed since wave pulse, having a limited period, directly to the selection matrix 47. This delayed sine wave pulse is also fed into a positive and negative clipping circuit 55 and 56, respectively. Each signal shaping circuit 55 and 56 is then connected to the matrix 47 by suitable matrix input lines. A matrix input line 57, from the generator 46 directly to the matrix 47, provides a sine wave pulse having a limited period which terminates simultaneously with the start of the sine wave pulse within the line 54. This limited pulse is also applied to a pair of signal shaping circuits 58 and 59 for positive and negative clipping before being applied to the matrix 47. The proper selection of the output signals from the various signal shaping circuits is achieved by selection input unit 60, similar to that shown in FIG. 3. This unit is connected by control lines to the matrix 47 for controlling the setting of the matrix and the transmission of the shaped output signals therethrough to an output line and output terminal 61 connected to the galvanometer 35. It should be understood that the particular pulse shapes shown herein are illustrative and the present invention is not intended to be limited thereby. For example, the sine wave pulses could be replaced with a series of square wave pulses.

Utilizing the embodiment just described, the numeral "6" may be printed upon the recording medium 39 through the selection of the output signals from the single shot circuit 48, line 57, single shot circuit 49, and positive clipping circuit 55, respectively. That is, the first spike pulse from circuit 48 causes a first recording beam, focused on the opaque mask 38, to sweep across the full width of the slit 40 and back again, thus forming the lowermost leg of the numeral "6" on the recording medium 39. The second recording beam remains on the mask and therefore does not effect the recording medium. The sine wave pulses from line 57 is then applied to the galvanometer for deflecting each recording beam alternately into an adjacent corner of slit 38 thus recording a pair of longitudinal lines for forming the lower portion of the numeral "6." A second spike pulse causes the first recording beam to again sweep across the slit 38. Finally, a positively clipped signal from circuit 55 causes the galvanometer mirror to deflect the second recording beam into the left-hand corner of the slit 38 for completing the numeral "6." In a like manner each of the numerals of FIG. 5 may be formed upon the recording medium 39.

Figure 7:
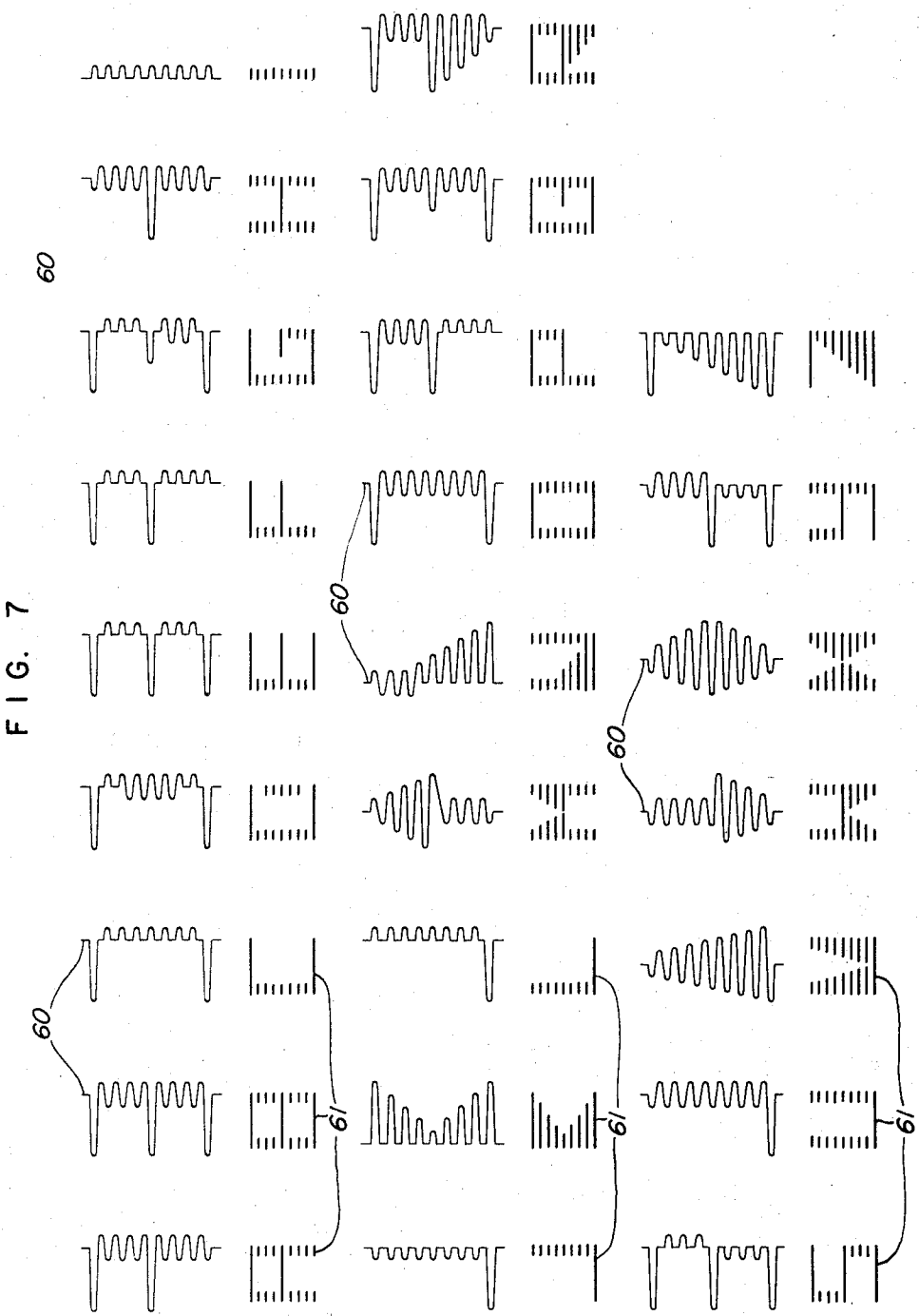
FIG. 7 is a pictorial representation of modified electrical input signals and resultant recorded letters of the alphabet obtained from the apparatus shown in FIG 4.

It is obvious that, by applying more complicated electrical input signals to the galvanometer 35, other recorded representations, such as letters of the alphabet, may be formed. Suitable galvanometer electrical input signals 60 and corresponding recorded characters, in the form of recorded alphabetical letter representations 61, are shown in FIG. 7.

The apparatus thus described is capable of printing multiple columns of alphanumeric characters such that the columns form lines which are read across the recording medium perpendicular to the longitudinal motion thereof. Obviously, the number of columns which may be printed are determined by the number of galvanometers which are provided for. In some applications it is desirable to print a single column of numbers or letters of the alphabet. Using the apparatus described hereinabove such a column would be read from top to bottom, one character at a time, along individual lines perpendicular to the longitudinal motion of the recording medium. In order to enable the single column to be read more rapidly, the characters thereof should be arranged to be read along a line parallel to the longitudinal motion of the recording medium. A recording apparatus which enables such a printing arrangement is shown in FIG. 8.

Figure 8:
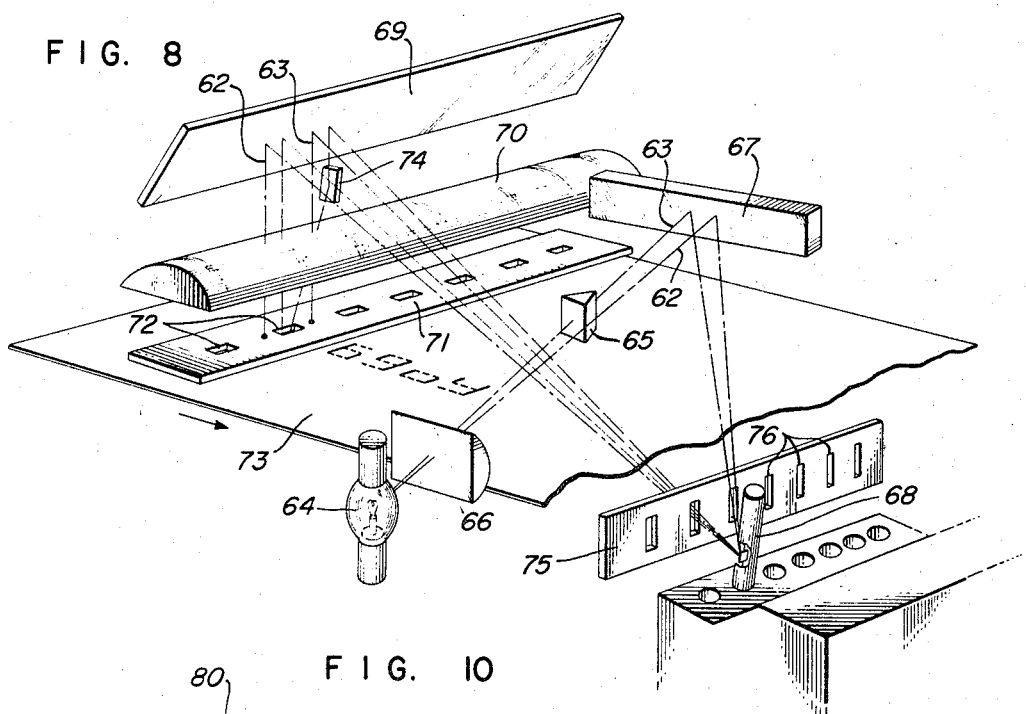
FIG. 8 is a diagrammatic perspective view, showing the embodiment of FIG. 4 arranged for printing alphanumeric characters which are read along a line parallel to the longitudinal axis of the recording medium.

In FIG. 8, as in FIG. 4, first and second light beams 62 and 63 are obtained from a light source 64 directly and through a prism 65 for effectively establishing a second apparent light source. These beams are focused by a lens 66 toward a first mirror 67, the second beam 63 passing through the prism 65, where they are reflected onto a galvanometer mirror, not shown, within a galvanometer 68. The galvanometer mirror is effective to direct the light beams, 62 and 63, toward a second mirror 69 where they are reflected downwardly through a lense 70 and focused upon an opaque mask 71. The mask is equipped with a slit 72, having an elongated longitudinal axis, whereby each recording beam is aligned with the longitudinal axis thereof and positioned upon the mask, in the absence of an electrical input signal applied to the galvanometer 68. A recording medium 73 is driven under the recording mask 71, opposite from the lens 70, along an axis perpendicular to the longitudinal axis of the slit 72. A third mirror 74 is provided between the second mirror 69 and the mask.

An electrical input signal, to be described hereinbelow, is applied to the galvanometer 68 for causing a deflection thereon in a clockwise direction, as viewed in FIG. 8. The second light beam 63 is thereby deflected to the right where it strikes the third mirror 74 and is reflected into the center of the slit 72. The first light beam 62 also deflects to the right and into the left corner of the slit 72. Each recording beam thereby forms a pair of longitudinal recording marks on the recording medium 73. If the galvanometer 68 is displaced in a counter-clockwise direction by a suitable electrical input signal, the second light beam 63 is displaced into the right corner of the slit 72 for forming a single longitudinal recording mark on the medium 73. The first light beam 62 is moved further onto the mask and does not effect the recording medium. Three longitudinal recording marks may be formed on the medium 73 by alternately deflecting the galvanometer in clockwise and counter-clockwise directions. This arrangement forms a recording trace in each corner of the slit and also in the center thereof.

Although the embodiments have been described in relation to a single galvanometer 68, it is obvious that a plurality thereof may be used. When more than one galvanometer is used caution must be taken that the recording light beam formed from a first galvanometer will not be deflected into the slit 72 associated with a second galvanometer. Should this occur, an obvious undesirable distortion of the resulting alphanumeric characters would result. This may be prevented by spacing the plurality of slits 72 apart from each other or by providing a second mask 75 to prevent the light beams from a first galvanometer from interfering with those of a second galvanometer. The second mask 75 includes a plurality of slits 76, one for each galvanometer, having a longitudinal axis perpendicular to the longitudinal axis of the first slits 72. The second mask 75 is shown in close relationship with the galvanometer 68 for simplicity of representation. However, the mask may be located anywhere between the galvanometer 68 and the recording medium 73, and best results are obtained when it is centered therebetween. Similarly, the second mask 75 may be utilized in the embodiments of FIGS. 1 and 4 where it is desired to use more than one galvanometer for multiple channel printing of alphanumeric characters. The mirror 74, like the second mask 75, may be located anywhere between the galvanometer 68 and the recording medium 73.

Referring now to FIG. 9 the electrical input signals which may be applied to the galvanometer 68 are shown at 77 and the resulting recorded alphanumeric characters are illustrated at 78.

Figure 10:
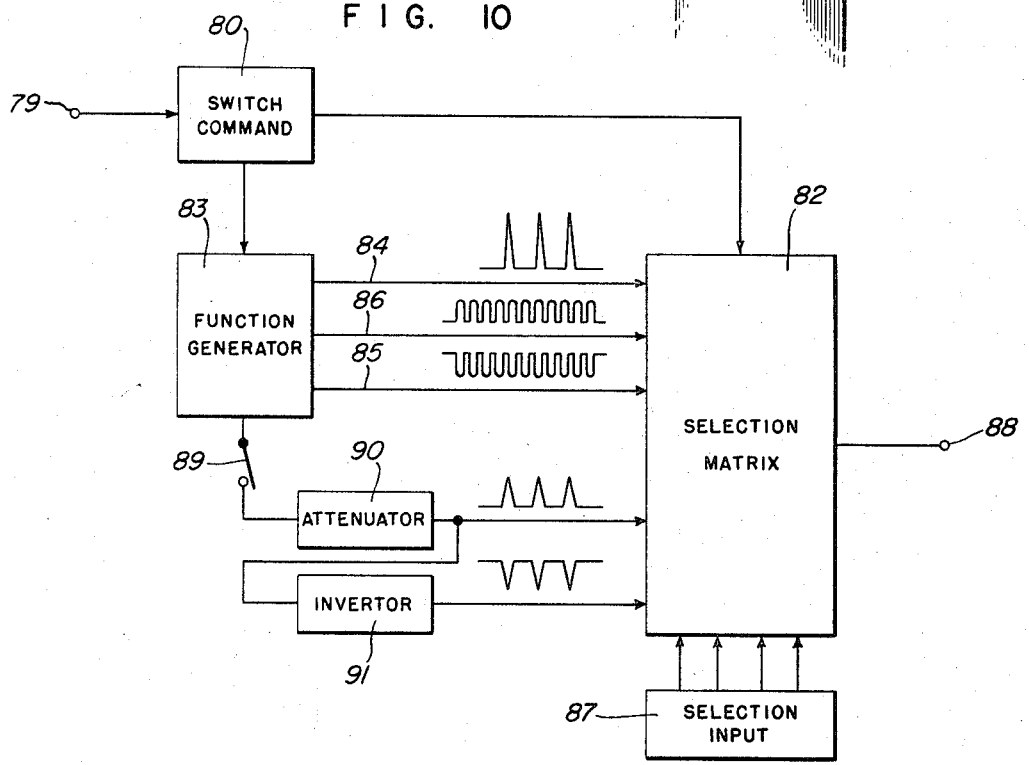
FIG. 10 is a schematic representation of input circuitry suitable for obtaining the electrical input signals shown in FIGS. 5 and 9.

FIG. 10 illustrates the input circuitry for providing the electrical input signals 77 to the galvanometer 68. This embodiment is characterized by a reduced number of signal shaping circuits necessary to provide the required alphanumeric character. A print command is received at terminal 79 and applied to a switch command network 80. A timed pulse signal from the switch command network 80 is applied directly to a selection matrix 82 and also to a function generator 83. The function generator 83 includes a pulse generator and an oscillator of conventional configuration for providing a series of three spike pulses over a matrix input line 84 and a positively and negatively clipped sine wave pulses over input lines 85 and 86, respectively. The spike pulses within line 84 coincide with the timed pulse signal from the switch command network 80. That is, the time pulse signal is divided into three equal parts, corresponding to three character zones, and each portion thereof produces a spike within the function generator 83 for application to the selection matrix 82. The sine wave pulses are not a function of the timed pulse signal from the switch command at this stage. Each of the output signals from the signal shaping circuits, 80 and 83, are selected by an input from a selection input unit 87 which is applied over a plurality of matrix control lines to the selection matrix along with the time pulse signal. The resultant single output from the matrix is provided through an output line to an output terminal 88 for application to the galvanometer 68. As stated hereinabove with regard to FIG. 6, the specific pulse shapes are illustrative and not intended to limit the present invention; for example, the sine wave pulses may be replaced with square wave pulses.

The input circuitry thus described can be utilized to produce the electrical input signals 41 and resultant recorded alphanumeric characters 42 of FIG. 2 and with modification those of FIG. 9, as will be hereinafter described. For example, to write the numeral "3" with the apparatus of FIG. 4 the first part of the timed pulse signal is combined with the input signal from the selection input unit 87 for allowing the first spike pulse on line 84 to be applied to the output terminal 88. The negatively chopped sine wave pulse from line 86 is then applied thereto for writing a single longitudinal line. The second spike pulse is then applied, followed again by the chopped sine pulse, and a third spike pulse for completing the numeral "3." In order to write the numeral "3," shown in FIG. 9 and using the apparatus of FIG. 8, a first spike pulse from line 84 is applied to the output terminal 88 by the selection matrix. This spike pulse displaces each of the recording beams to the left, with one passing across the slit 72 for forming a horizontal line on the recording medium 73 and the other being displaced further onto the mask 71. This is followed by the continuous application of the chopped sine wave pulses from both input lines 85 and 86 for displacing the recording beams to the left and right and forming three longitudinal lines on the recording medium 73. The lines are formed in each corner of slit 72 and the center thereof, as described hereinabove.

The input circuit described thus far may be used to print the characters shown in FIG. 5 and also some of those shown in FIG. 9 including the numerals 1, 3, 7 and 8. In order to print the remaining numbers, it is necessary to provide a second and third set of spiked pulses. These are obtained by closing a switch 89 and applying the spiked pulse in line 84 through an attenuator circuit 90 for reducing the amplitude thereof by one-half before application to the matrix 82. The same signal is also inverted by circuit 91 before application to the matrix 82. Using these additional pulse shaping circuits the full set of numerals from 0 to 9 may be printed in a column which is parallel to the longitudinal motion of the recording medium 73 and read along a line that is also parallel thereto.

The lower characters of FIG. 9 illustrate modifications of the electrical input signals which will enable the recording of numbers 0, 4, and 6 that are similar in appearance to those of FIG. 5. For example, the lower number "6" is printed by the application of the first spiked pulse signal from the invertor circuit 91, the positively chopped sine wave pulse from input line 85, and the last spiked pulse signal from line 84. The upper number "6" of FIG. 9 is printed in the same manner, but the positively chopped and negatively chopped sine wave pulses are applied simultaneously for forming the three longitudinal lines thereof. The lower number "4" is printed by applying the first spiked pulse signal from input line 84. This displaces the recording beam 63 fully across the transverse slit 72 to the left and moves the beam 62 further onto the mask. The recording beam 63 is then returned to a position in the center of the slit 72 by application of a square wave pulse, from a circuit not shown, whose amplitude is one-half the amplitude of the spiked pulse. A sine wave may be superimposed upon the square wave pulse, as shown, for preserving a common appearance between the lower number "4" of FIG. 9 and the "4" of FIG. 5. The lower number "0" of FIG. 9 may be printed by the application of a square wave pulse, also having a sine wave superimposed thereon, whose period is twice that used for the lower number "4." This pulse offsets the pair of recording beams fully across the slit 72 to the left for placing a horizontal line on the recording medium 73. At this point a mirror, not shown, reflects the light beam 62 back across the slit to the opposite right-hand corner thereof, while the light beam 63 forms a recording mark in the left-hand corner. This arrangement, like those for the numbers 4 and 6, may be utilized to provide numeric characters which are identical to those of FIG. 5.

Obviously many modifications of the present invention will become apparent to those skilled in the art after consideration of the embodiments herein described. For example, the apparatus of FIG. 1 could be provided with an input circuit which applies a high frequency square wave electrical input signal to the galvanometer. This would cause the rapid movement of the recording beam for each surface of the mask 7 across the slit 8 with the recording beam motion reversing itself on the mask surface. The rapid motion of the recording beam across the slit 8 discolors the recording medium 9 but does not form a dark recording mark thereon. The recording of longitudinal lines is achieved by superimposing a higher frequency signal on the square wave signal. If the superimposed signal is applied only to the positive peak of the square wave, the recording spot is caused to be displaced into the corner of slit 8 for forming one longitudinal line. Superimposing the signal on the negative peak forms a second longitudinal line opposite from the first. Application of the superimposed signal on both the positive and negative portions of the square wave forms two longitudinal lines under each corner of the slit 8 on the recording medium 9. When it is desired to form a horizontal line, the frequency of the square wave is momentarily reduced for slowing the transverse sweep of the recording beam across the slit 8.

The embodiments of the invention in which an exclusive property or privilege is claimed are defined as follows:

1. An alphanumeric recording apparatus comprising a galvanometer movement having a mirror driven thereby, input circuitry means connected to said galvanometer movement and arranged to supply predetermined electrical input signals thereto, a light source arranged to supply a beam of light onto said mirror, recording beam focusing means arranged to focus a recording beam from said light beam reflected from said mirror, an opaque recording mask having a transverse slit therein with a slit length equal to one dimension of an alphanumeric character to be recorded, means positioning said mask to intercept said recording beam in an unenergized state of said galvanometer movement, and a light sensitive recording medium arranged to be passed under said mask in a direction perpendicular to said transverse slit therein, whereby said electrical input signal displaces said galvanometer movement for reflecting said recording beam into said slit thus exposing said light sensitive recording medium to form an alphanumeric character thereon.

2. An alphanumeric recording apparatus as set forth in claim 1 wherein said input circuitry means includes a plurality of signal shaping circuits, a selection matrix having a plurality of input lines, an output line, and a plurality of control lines for connecting a selected group of said plurality of signal shaping circuits to said matrix output line, and a selection input means arranged to select said signal shaping circuits by operating said matrix through said plurality of matrix control lines.

3. An alphanumeric recording apparatus as set forth in claim 1 wherein said light source arranged to supply a beam of light onto said galvanometer mirror includes a lens means and a second mirror means arranged between said light source and said galvanometer mirror, and said recording beam focusing means includes a third mirror means and lens means arranged between said galvanometer mirror and said mask.

4. An alphanumeric recording apparatus comprising a galvanometer movement having a mirror driven thereby, input circuitry means connected to said galvanometer movement and arranged to supply predetermined electrical input signals thereto, a light source arranged to supply a pair of beams of light onto said mirror, recording beam focusing means arranged to focus a pair of recording beams from said pair of light beams reflected from said mirror, an opaque recording mask having a transverse slit therein with a slit length equal to one dimension of an alphanumeric character to be recorded, means positioning said mask to intercept both of said recording beams in an unenergized state of said galvanometer movement, said beam forming means being arranged to separate said beams by a distance greater than the length of said slit, and a light sensitive recording medium arranged to pass under said mask in a direction perpendicular to said transverse slit therein, whereby said electrical input signal displaces said galvanometer movement for reflecting said recording beams into said slit thus exposing said light sensitive recording medium to form an alphanumeric character thereon.

5. An alphanumeric recording apparatus as set forth in claim 4 wherein said input circuitry means includes a plurality of signal shaping circuits, a selection matrix having a plurality of input lines, an output line, and a plurality of control lines for connecting a selected group of said plurality of signal shaping circuits to said matrix output line, and a selection input means arranged to select said signal shaping circuits by operating said matrix through said plurality of matrix control lines.

6. An alphanumeric recording apparatus as set forth in claim 4 wherein light source arranged to supply a pair of beams of light onto said galvanometer mirror includes a lens means and a second mirror means arranged between said light source and said galvanometer mirror for forming a first light beam, and a prism means between said lens means and second mirror means for forming a second apparent light source and thereby a second light beam.

7. An alphanumeric recording apparatus as set forth in claim 4 additionally comprising a mirror means disposed between said galvanometer and mask for reflecting one of said recording beams into the center of said slit within said mask when said galvanometer movement is displaced, whereby said electrical input signal applied to said galvanometer movement exposes said recording medium for forming three longitudinal lines thereon, as said medium passes under said mask.

8. An alphanumeric recording apparatus as set forth in claim 4 additionally comprising a plurality of galvanometer movements each with an associated mirror, a plurality of input circuitry means individually connected to each galvanometer, a plurality of light sources, lens means individually arranged with each light source and galvanometer for providing a pair of light beams upon said galvanometer mirror, said recording beams focusing means arranged to focus the plurality of said pairs of recording beams upon said mask, and a plurality of transverse slits within said mask individually associated with each pair of said light beams, whereby said electrical input signals applied to each galvanometer movement displaces said pair of recording beams associated therewith for forming multiple columns of alphanumeric characters upon said light sensitive recording medium.

9. An alphanumeric recording apparatus as set forth in claim 8 additionally comprising a second mask having a plurality of slits therein equal in number to said slits in said first mentioned mask, and said mask disposed between said plurality of galvanometer movements and said first mentioned mask, thereby preventing a recording beam from a first galvanometer from interfering with a recording beam from a second galvanometer.

References Cited

UNITED STATES PATENTS 3,208,075   9/1965   Casavant _____ 346—33

RICHARD B. WILKINSON, *Primary Examiner.*

J. W. HARTARY, *Assistant Examiner.*

U.S. Cl. X.R.

178—30